US007145408B2

(12) United States Patent
Shepard et al.

(10) Patent No.: US 7,145,408 B2
(45) Date of Patent: Dec. 5, 2006

(54) RESONANT CLOCK DISTRIBUTION FOR VERY LARGE SCALE INTEGRATED CIRCUITS

(75) Inventors: Kenneth Shepard, Ossining, NY (US); Steven Chan, Yonkers, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 54 days.

(21) Appl. No.: 10/501,278

(22) PCT Filed: Jan. 13, 2003

(86) PCT No.: PCT/US03/00932

§ 371 (c)(1),
(2), (4) Date: Jul. 9, 2004

(87) PCT Pub. No.: WO03/061109

PCT Pub. Date: Jul. 24, 2003

(65) Prior Publication Data

US 2006/0139112 A1    Jun. 29, 2006

Related U.S. Application Data

(60) Provisional application No. 60/347,415, filed on Jan. 11, 2002.

(51) Int. Cl.
*H03B 5/12* (2006.01)
(52) U.S. Cl. .............................. 331/117 D; 337/117 R; 337/117 FE; 337/167; 337/117 DP
(58) Field of Classification Search ................. 331/46, 331/47, 2, 107 SL, 117 D, 117 R, 117 FE, 331/107 DP
See application file for complete search history.

(56) References Cited

U.S. PATENT DOCUMENTS

| 6,057,724 A | 5/2000 | Wann ........................ 327/292 |
| 6,556,089 B1 * | 4/2003 | Wood .......................... 331/57 |
| 7,015,765 B1 * | 3/2006 | Shepard et al. ......... 331/117 D |
| 2003/0006851 A1 | 1/2003 | Wood |

* cited by examiner

*Primary Examiner*—Arnold Kinkead
(74) *Attorney, Agent, or Firm*—Baker Botts LLP

(57) ABSTRACT

A circuit for distributing a clock signal in an integrated circuit includes a capacitive clock distribution circuit. At least one additional inductor is formed in a metal layer of the integrated circuit and is coupled to the clock distribution circuit. The inductor, which may distributed throughout the integrated circuit, has an inductance value selected to resonate with impedance of the capacitive clock distribution circuit. By operating the clock distribution circuit at resonance, power dissipation is reduced while skew and jitter performance can be improved.

20 Claims, 3 Drawing Sheets

RESONANT CLOCK DISTRIBUTION FOR VERY LARGE SCALE INTEGRATED CIRCUITS

RELATED APPLICATIONS

This application is a national phase of International Patent Application No. PCT/US03/00932, filed Jan. 13, 2003, published on Jul. 24, 2003 as International Patent Publication No. WO 03/061109, which claims priority from U.S. Provisional Patent Application Ser. No. 60/347,415, filed Jan. 11, 2002 and entitled "Resonant global clock distribution for very large-scale integrated circuits," each of which are incorporated by reference in their entireties herein, and from which priority is claimed.

FIELD OF THE INVENTION

The present invention relates generally to clock distribution in integrated circuits and more particularly relates to methods of distributing a high frequency clock with improved power efficiency and skew and jitter performance.

BACKGROUND OF THE INVENTION

Clocking large digital chips with a single high-frequency global clock is becoming an increasingly difficult task. As circuit size and clock frequency continue to increase, skew and jitter as well as power consumption are becoming increasingly important design considerations.

While jitter and skew have traditionally been the dominant concerns in clock circuit design, power consumption may soon gain primacy. With each new generation of integrated circuit, clock capacitance and frequency are increasing resulting in significant increases in dynamic power dissipation. Considering that a 72-W 600-MHz Alpha processor dissipates more than half of its power in the clock circuit, this is clearly an area ripe for design optimization.

To date, most of the work in clock distribution has been focused on addressing the issues of skew and jitter. There are two general approaches to clock wiring, trees and grids. Tunable trees consume less wiring and, therefore, represent less capacitance, lower wiring track usage, lower power, and lower latency. Trees must, however, be carefully tuned and this tuning is a very strong function of load. Thus, there is substantial interplay between the clock distribution circuit and the underlying circuit being driven by the clock circuit. Grids, in contrast, can present large capacitance and require significant use of wiring resources, but provide relative load independence by connecting nearby points directly to the grid. This latter property has proven irresistible and most recent global clock distributions in high-end microprocessors utilize some sort of global clock grid. Early grid distributions were driven by a single effective global clock driver positioned at the center of the chip.

Most modern clock distribution circuits use a balanced H-tree to build up and distribute the gain required to drive the grid. The grid drive points are distributed across the entire chip, rather than being concentrated at a single point; this means that the grid can be less dense than a grid that is driven in a less distributed fashion, resulting in less capacitance and less consumption of wiring resources. The shunting properties of the grid help to cancel out skew and jitter from imperfections in the tree distribution, as well as balance out uneven clock loads.

To prevent skew and jitter from accumulating with increased distance from the clock source, there have been several approaches for using multiple on-chip clock sources. One approach is to create a distributed phase-locked loop (PLL) in which there is a single phase-frequency detector, charge pump, and low-pass filter, but multiple voltage-controlled oscillators (VCOs). These oscillators are distributed across the chip to drive a single clock grid. The grid acts to help cancel out across-chip mismatches between the VCOs and limit skew and cycle-to-cycle jitter. The main problem with this approach is the need to distribute a "global" analog voltage across the chip (the VCO control voltage), which can be very susceptible to noise.

An alternative to this approach is to have multiple PLLs across the chip, each driving the clock to only a small section or tile of the integrated circuit. Clock latency from the oscillator is reduced because the clock distribution is local and the clock loads for each PLL is smaller. In such a design, each PLL must average the phases of its neighbors to determine lock and nonlinearities must be introduced into the phase detectors to avoid mode-locked conditions. Any mismatch between the phase detectors adds uncompensated skew to the distribution.

To control clock power, the most common technique employed is that of clock gating, in which logic is introduced into the local clock distribution to "shut off" the clocking of sections of the design when they are not in use. These techniques generally favor relegating more of the clock load to "local" clocking where it can be gated and have been widely employed in low-performance designs in which power is of prominent concern (e.g. digital signal processors for mobile, battery-powered applications). Until recently, clock gating has not been favored as a technique for high-performance design because of the skew and jitter potentially introduced by the clock gating logic and because of delta-I noise concerns (i.e., transients introduced in the power supply distribution when large amounts of switching clock capacitance are turned on and off.) As clock power exceeds 80 W, clock gating is beginning to be employed even in these high-performance chips.

The natural limit of clock gating is to approach more asynchronous design techniques, in which blocks are activated only in the presence of data. Globally-asynchronous, locally synchronous (GALS) design preserves the paradigm of synchronous design locally. Asynchronous design techniques, however, are more difficult to design, costlier to implement, more challenging to test, and more difficult to verify and debug. There is clearly a significant desire to continue to use and improve upon globally synchronous designs.

The virtues of LC-type oscillators for achieving lower-power and better phase stability (than oscillators based on delay elements) have been long recognized. The adiabatic logic community has already considered the importance of resonant clock generation since the clocks are used to power the circuits and such resonance is fundamental to the energy recovery. These generators generally produce sinusoidal or near sinusoidal clock waveforms. To combine the clock generation and distribution, distributed LC oscillators in the form of transmission line systems have been considered. These also bear resemblance to distributed oscillators. In salphasic clock distribution, a standing (sinusoidal) wave is established in an unterminated transmission line. As a result, each receiver along the line receives a sine wave of identical phase (but different amplitude). Unfortunately, on-chip transmission lines tend to be very lossy and exhibit low bandwidths for long wire lengths. This produces significant phase error due to the mismatch in amplitude between forward and reverse propagating waves.

Another approach that has been proposed uses a set of coupled transmission line rings as LC tank circuits, pumped by a set of cross-coupled inverters to distribute clock signals. The propagation time around the rings determines the oscillation frequency and different points around the ring have different phases. This approach, however, also has many significant difficulties. Rings must be precisely "tuned" even with potentially varying (lumped) load capacitance producing discontinuities in the transmission line. Fundamentally, the distribution and the resonance determining the clock frequency are fundamentally linked, in which the former may depend on geometry or other constraints inconsistent with the desired resonance frequency.

Another approach to synchronized clock distribution in an integrated circuit is disclosed in U.S. Pat. No. 6,057,724 to Wann. The Wann patent discloses a clock distribution circuit which includes a parallel plate microstrip resonator formed in the integrated circuit which operates as a resonant cavity to generate a clock signal.

Despite the various efforts to provide clock distribution circuits for very large scale integrated circuits, there remains a need for a clock distribution circuit which offers lower power consumption without sacrificing, and preferably improving, skew and jitter performance.

SUMMARY OF THE INVENTION

It is an object of the present invention to provide an integrated circuit clock distribution topology which enables efficient distribution of high speed clock signals in large and very large scale integrated circuits.

It is a further object of the present invention to provide a clock distribution circuit which consumes less power than a conventional clock distribution circuit operating at the same clock speed.

It is a further object of the present invention to provide a clock distribution circuit which consumes less power than a conventional clock distribution circuit operating at the same clock speed while maintaining or improving skew and jitter performance.

It is another object of the present invention to provide a clock distribution circuit in which the clock distribution circuit presents a resonant circuit at the operating frequency of the clock.

In accordance with the present invention, a circuit for distributing a clock signal in an integrated circuit is provided which includes a capacitive clock distribution circuit having at least one conductor therein and at least one inductor formed in a metal layer of the integrated circuit. The inductor(s) is coupled to the conductor and has an inductance value selected to resonate with the capacitive clock distribution circuit.

Preferably, inductor(s) takes the form of a number of inductors, such as spiral inductors, distributed throughout the integrated circuit.

The clock distribution circuit can include a clock grid circuit which is coupled to one or more H-tree driving circuits. In larger integrated circuits, a hierarchical architecture can be employed wherein the integrated circuit is partitioned into a plurality of sectors with each sector being driven by an H-tree and the sector-based H-trees being driven by at least one further H-tree distribution circuit.

In another embodiment in accordance with the present invention, a clock distribution circuit includes a clock driver circuit which is coupled to a clock distribution circuit. The clock distribution circuit presents a clock circuit capacitance to the clock driver circuit. A number of inductors are coupled to the clock grid circuit. The inductors are spatially distributed about the clock grid circuit and present a total inductance value which is substantially resonant with the clock circuit capacitance at the operating frequency of the clock driver circuit.

The clock distribution circuit can include a clock grid which is coupled to one or more tree distribution circuits. The clock driver circuit can include a master clock which is provided to one or more buffer amplifiers throughout the integrated circuit. Alternatively, the clock driver circuit can be formed with a number of synchronized phase lock loop circuits coupled to the clock grid circuit.

To optimize the Q of the resonant clock circuit, the capacitance of the clock distribution circuit can be tuned by including one or more capacitors which can be selectively switched into or out of the clock distribution circuit to optimize the circuit resonance.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1A:
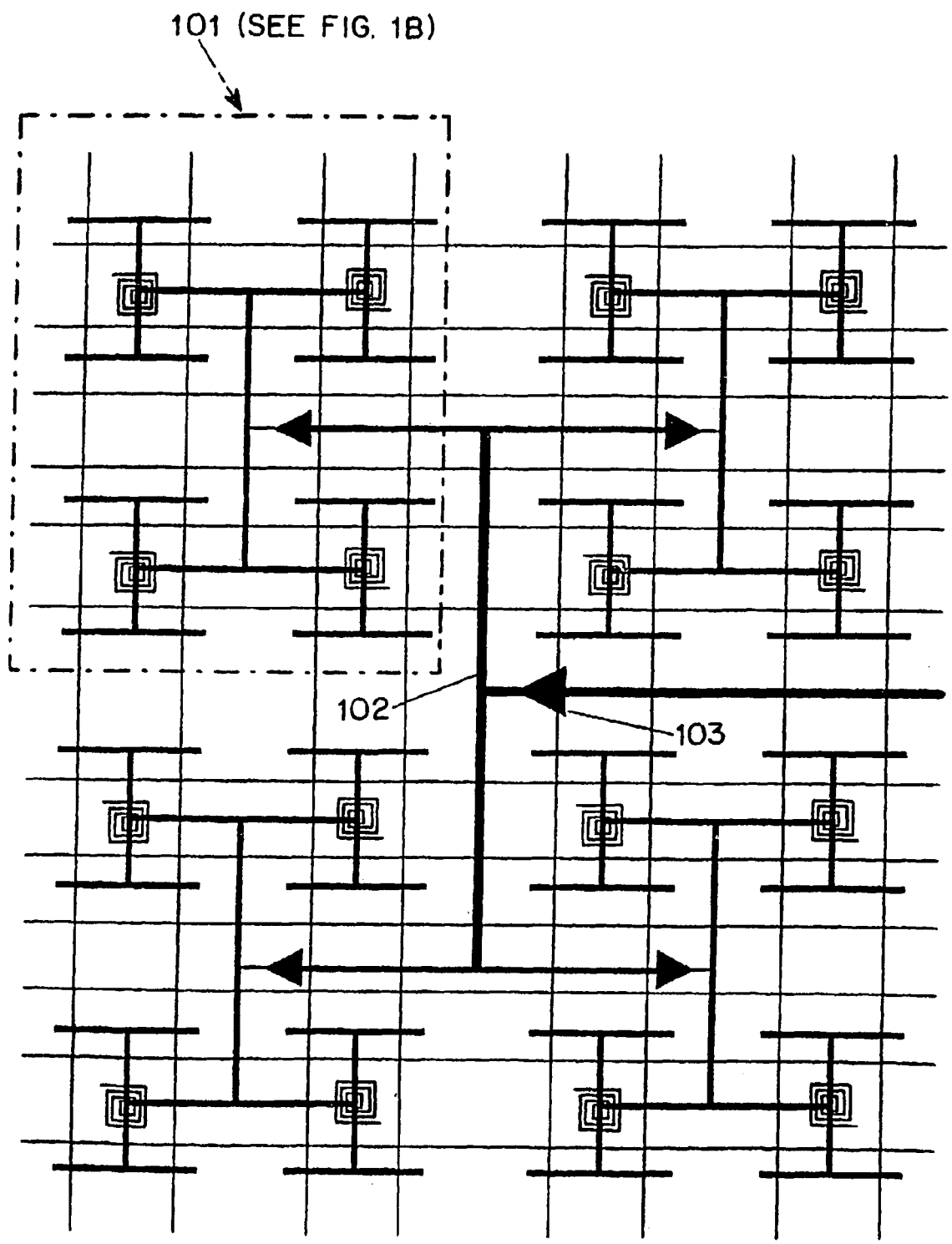
FIG. 1A is a pictorial view of a resonant clock distribution circuit in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present invention provides a circuit topology and design method for distributing a clock signal within an integrated circuit. The present invention provides a clock distribution circuit which is substantially resonant at the clocking frequency such that power efficiency is improved and skew and jitter is minimized.

Figure 1B:
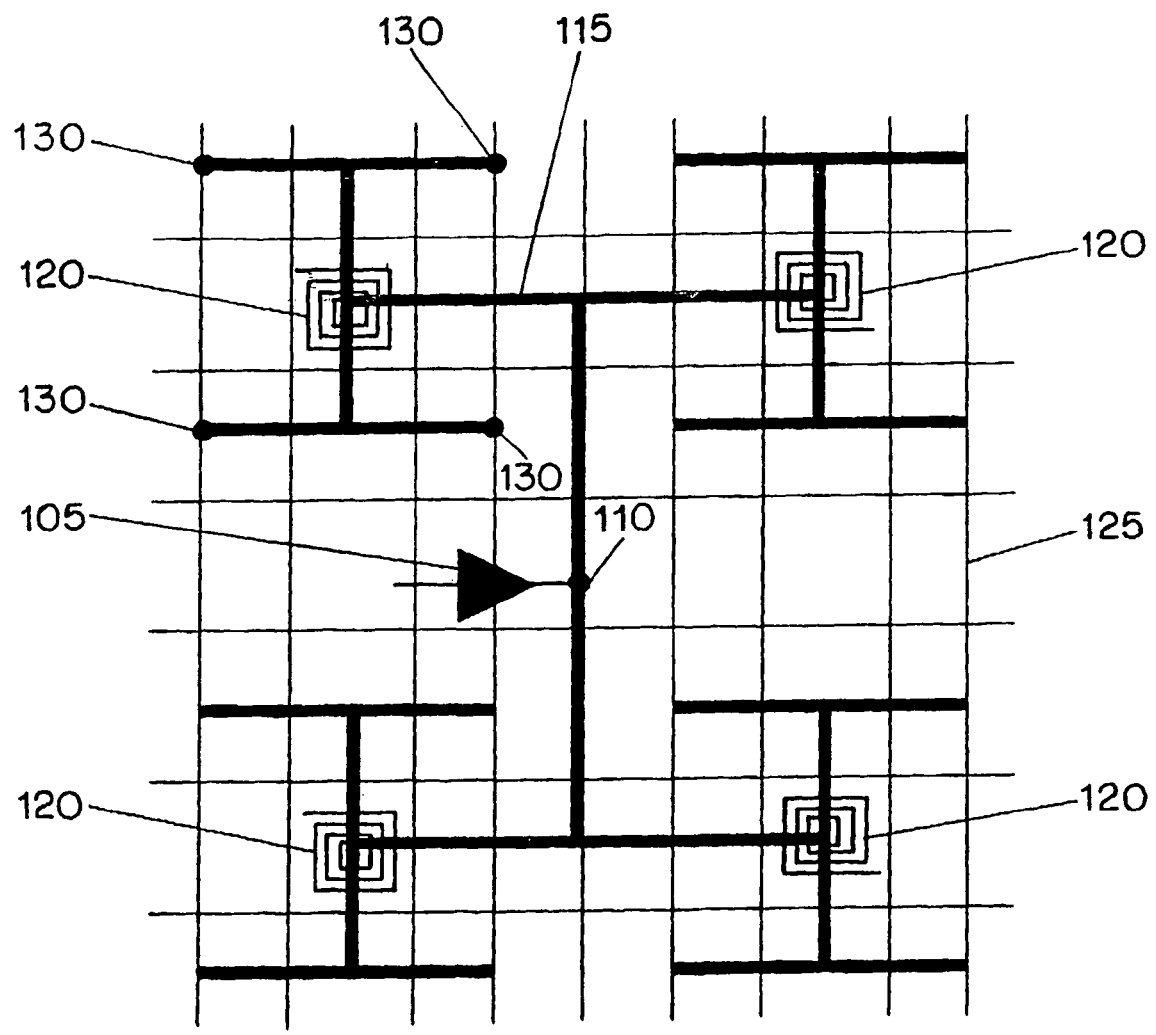
FIG. 1B is a detailed view of one sector of the resonant clock distribution circuit of FIG. 1A.

FIG. 1A is pictorial diagrams illustrating a top planar view of an embodiment of the present resonant clock distribution circuit as viewed through a number of metalization layers of an integrated circuit. The circuit of FIG. 1B illustrates a single sector 101 of the circuit of FIG. 1A. The circuit of FIG. 1B may represent a sector having an area of about 2,500 μM×2,500 μM. A typical microprocessor clock distribution may include several dozen of such clock distribution sectors, which are coupled together to provide a global clock distribution circuit. The circuit of FIG. 1A illustrates the circuit of FIG. 1B implemented in four adjacent sectors of an integrated circuit with the four sectors 101 being driven by a further clock distribution circuit, such as an H-tree 102, to deliver the clock signal from a master clock 103 to the individual sector driver circuits. It will be appreciated that while FIG. 1A illustrates an exemplary interconnection of adjacent sectors, this figure still only represents a small portion of an entire integrated circuit. Depending on the size of the integrated circuit, additional hierarchical levels of clock distribution may be provided between the master clock 103 and the individual sectors 101.

Referring to FIG. 1B, the circuit for each sector 101 includes a clock driver circuit 105 which is coupled to a conventional H-Tree 115 at central driving point 110. The H-tree 115 is coupled to a clock grid 125 via connection vias 130 in a manner well known in the art. The H-tree 115 and clock grid 125 along with the circuitry coupled to the clock grid 125, present a capacitive load to the clock driver circuit 105 which is referred to herein as the clock circuit capacitance ($C_{clock}$). The clock driver circuit will generally take the form of a buffer amplifier. However, in certain embodiments, the clock driver circuit 105 may take the form of a local oscillator which is synchronized to a master clock. The present invention employs at least one inductor, and more preferably a number of spiral inductors 120, which are coupled to the clock grid 125 and operate to resonate with the clock circuit capacitance, thereby forming a resonant circuit with the clock grid 125. In the embodiment depicted in FIGS. 1A and 1B, the spiral inductors 120 have one end coupled directly to the clock grid 125 and the other end to a ground potential via a large decoupling capacitance, not shown. The use of AC coupling of inductors 120 in this fashion establishes a mid-rail DC voltage about which the clock grid oscillates. This mid-rail DC voltage can be used as a reference voltage in a pseudodifferential switching circuit. The decoupling capacitors can be formed as thin-oxide capacitors which are located in the integrated circuit below each spiral inductor 120 within the active device layer.

Figure 2:
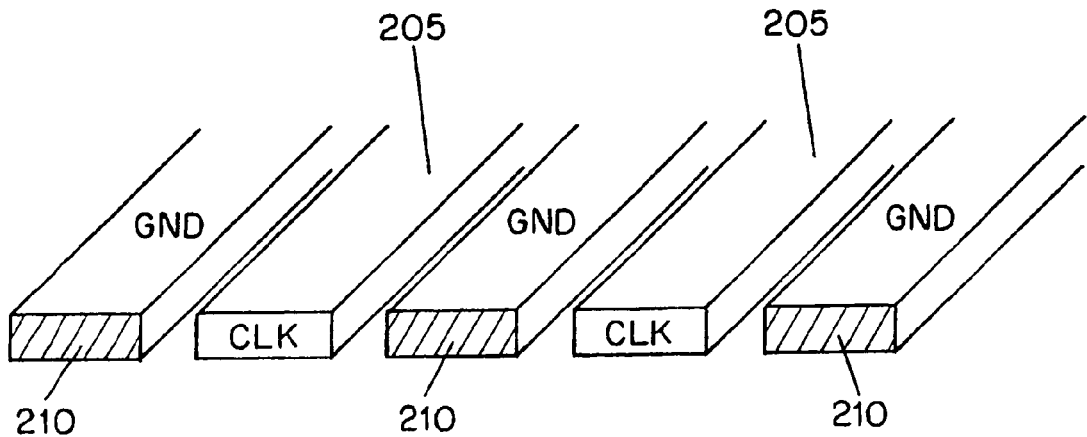
FIG. 2 is a perspective view illustrating the fingering and shielding of clock grid wires which maintains a low stray inductance in the clock circuit.

The clock tree 115 is typically formed on the top two metal layers (e.g., M6 and M5 layers) of the integrated circuit and the clock grid 125 is formed on the top three metal layers (e.g., M6, M5, M4 layers) of the integrated circuit. The clock grid 125 is formed as a regular mesh using 1.5 µm wide line segments which are fingered 0.5 µm apart. As illustrated in FIG. 2, it is preferable for each clock line of the clock tree 115 and clock grid 125 to be split into finger segments 205 and shielded with ground segments 210 on either side and between the clock distribution line segments. The clock tree 115 is formed using 10 µm wide line segments spaced 0.5 µm apart. For the sake of clarity, the grid for power distribution, which is generally formed on the M4, M5 and M6 layers, has been omitted from the diagram in FIG. 1.

The spiral inductors 120 are fabricated on the top two metal layers and are formed with a spiral length, spacing and line width to present an inductance value that will substantially resonate with the capacitance presented by the clock tree 115 and clock grid 125 at the desired clock frequency.

The clock grid 125 generally presents a capacitive load in which the stray inductance is low. By way of a mechanical analogy, the capacitive clock grid 125 operating at resonance with the spiral inductors 120 can be viewed as a rigid mass which is supported by a number of springs and oscillates as a unit. Thus, at resonance, the entire clock grid 125 is oscillating in phase.

In contrast to the methods of clock distribution which utilize a standing wave in the distribution circuit, by virtue of the spiral inductors and low inductance of the grid circuit, the present circuit presents an eigenmode of the grid in which it rigidly oscillates as a contiguous unit at the clock frequency ($f_{clock}$). By taking steps to insure that the grid presents a low inductance, such as by fingering the clock distribution and grid conductors, unwanted resonances generally associated with the distribution circuit are pushed to high frequencies so that they do not interfere with the engineered resonance at $f_{clock}$.

It will be appreciated that in the present clock distribution circuits, the spiral inductors exist in an environment quite different from those that are presented in typical radio frequency (RF) applications in which these components are generally used. Specifically, the inductors 120 embedded in the metal-rich environment of a digital integrated circuit. As such, eddy current losses due to neighboring wires should be considered and minimized. Such eddy current losses will result in Q degradation of the resulting resonant clock circuit and may result in inductive noise in the power-ground distribution or in neighboring signal lines. Because the spiral inductors are generally much larger than the power grid, most of the potential deleterious coupling will be to the underlying power grid. To reduce eddy current formation in the underlying grid, the vias in the grid can be dropped and small cuts can be made in the wires. This technique is generally known to those skilled in the art of RF circuit design as it is analogous to ground plane laminations used for spiral inductors in RF circuits.

Figure 3:
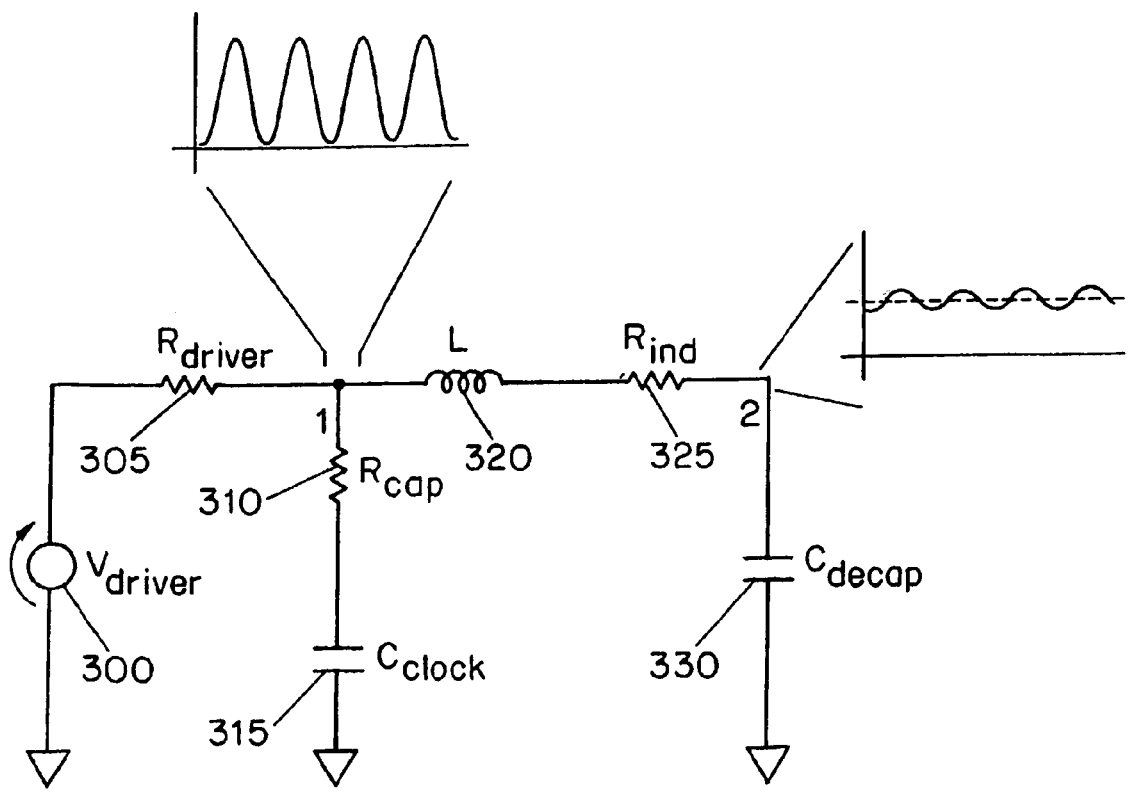
FIG. 3 is a schematic diagram illustrating a simplified lumped element equivalent circuit of the resonant clock distribution circuit of the present invention.

FIG. 3 is a schematic diagram illustrating a simplified equivalent circuit diagram for the resonant clock distribution circuit for one sector of an integrated circuit, such as shown in FIG. 1B. The clock driver 105 is represented as signal source 300 and series resistance $R_{driver}$ 305. The clock capacitance for the sector, including the clock grid 125, clock tree 115 and circuitry coupled thereto, is represented by a series RC circuit of $R_{cap}$ 310 and $C_{clock}$ 315. Spiral inductors 120 are represented by a series RL circuit with inductor L 320 and resistor R 325. The decoupling capacitor, which couples the spiral inductor to ground is represented by capacitor $C_{decap}$ 330.

The decoupling capacitor $C_{decap}$ 330 is chosen to have a value large enough such that the resonance formed with the inductor 320 is much lower in frequency than the desired resonant frequency of the clock grid and clock tree. Therefore, $C_{decap}$ 330 will generally have a value substantially larger than $C_{clock}$ 315. For example, setting $C_{decap}$ 330 at a value approximately ten times larger than $C_{clock}$ 315 is expected to provide adequate results. When this is achieved, the driving point admittance of the clock distribution circuit is substantially determined by the clock capacitance and inductance of inductors 320. This is expressed as:

$$Y_{driver}=j\omega(C_{clock}-1/(L\omega^2))$$

The inductance value of inductor 320 is selected such that the capacitive reactance of $C_{clock}$ is resonated out by the inductive reactance of inductor 320. When the circuit is substantially resonant at the clock frequency, rather than having the clock energy dissipated as heat during each clock cycle, a significant portion of the energy of the clock is converted from electrical to magnetic energy and back. This substantially non-dissipative power conversion process reduces the power consumption of the clock distribution thereby increasing efficiency. The improved efficiency also means that less heat needs to be dissipated by the device which can reduce heat sinking and venting requirements for the resulting integrated circuit.

While in the equivalent circuit of FIG. 3 the spiral inductors 120 are represented by a single inductance L 320 it is beneficial to distribute this total inductance using a large number of inductors 120 distributed throughout the grid as illustrated in FIGS. 1A and 1B. It will be appreciated that the spiral inductors 120 are coupled together as a parallel circuit. Thus, for a 1 GHz clock distributed on a clock grid 125 for a sector having a capacitance of 100 pf, approximately 250 pH of inductance is required to form a resonant circuit. This 250 pH inductance can be obtained by use of four (4) 1 nH spiral inductors distributed throughout the grid, as illustrated in FIG. 1B. A 1 nH spiral inductor can be formed in an area of about 100 μm square using 3 turns of 5 μm wide line segments. Distributing the inductance throughout the clock grid serves to reduce the peak current density through each inductor and balances the current distribution throughout the clock grid 125.

As with other generally known resonant circuits, the Q factor of the resonance of the clock circuit of the present invention effects the quality of the results. When the Q is higher, the clock driver circuits can be made weaker since there is less loss that must be overcome at the fundamental clock frequency. This is desirable as a weaker driver consumes less power and presents less skew and jitter. However, use of a weak driver tends to result in a more sinusoidal clock signal. When the Q is poor, the drivers must be larger to overcome the losses of the clock circuit. More power is dissipated in the distribution not only because more energy must be provided at the fundamental to overcome losses, but also due to lossy higher frequency components that are also being driven in the clock network by the drivers. Thus, efficiency is reduced.

Typically, the Q factor which is obtained in the embodiments described herein is on the order of 3–5. Higher Q values may be desirable to further improve power savings and skew and jitter performance. As higher Q values are obtained, the desirability of tuning the circuit becomes more significant. The present clock distribution can be tuned by including one or more MOS capacitors which are selectively coupled to the clock grid or distribution circuit, such as by MOS switches.

Skew and jitter in conventional clock distribution networks comes about because of spatial and temporal variation, respectively, in the clock latency. A significant component to skew and jitter is variation in the latency of the buffering (or gain) stages needed to drive the large capacitive load of the clock network. Across die variability, sometimes referred to as across-chip linewidth variation, or ACLV, is a significant source of skew and power-supply noise, which when coupled through the buffers, is a significant source of jitter. Resonant clock distribution circuits of the present invention can significantly reduce this component of clock latency by reducing the size of clock drivers, which can result in improved skew and jitter performance.

In the embodiment shown in FIGS. 1A and 1B, a hierarchical H tree distribution scheme is used to distribute a master clock driver signal throughout an integrated circuit to a number of distributed drivers in the individual sectors of an integrated circuit. It will be appreciated that various other clock distribution schemes can be used to drive the resonant clock circuit. For example, multiple phase lock loop circuits can be distributed throughout the clock grid with the PLLs driving the grid and being locked thereto. In this case, one of the PLL circuits is referenced to an external clock and the remaining PLLs synchronize to this master PLL. In this form of clock distribution, mode-locking, wherein the system is stable with non-zero relative phase difference between the PLLs, needs to be avoided. Should mode locking occur, significant short circuit current would flow.

During normal operating conditions, the circuit is intended to operate at the clock frequency at which the circuit is resonant. However, it is well known in the art that certain operations of an integrated circuit, such as during manufacturing testing or debugging operations, occur at clock frequencies well below the normal clock frequency. It will be appreciated that the present clock distribution circuits do not prevent such reduced frequency operations.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A circuit for distributing a clock signal having a clock frequency in an integrated circuit having a plurality of metal layers therein, comprising:
   a capacitive clock distribution circuit having at least one conductor therein; and
   at least one inductor in addition to the capacitive clock distribution circuit, wherein said at least one inductor is formed in a metal layer of the integrated circuit, said at least one inductor being coupled to said at least one conductor and having an inductance value selected such that the at least one inductor and the capacitive clock distribution circuit comprise a resonant circuit having a resonance frequency substantially equal to the clock frequency.

2. The circuit for distributing a clock signal, as defined by claim 1, wherein the at least one conductor in the clock distribution circuit includes a clock grid.

3. The circuit for distributing a clock signal, as defined by claim 2, wherein the at least one conductor in the clock distribution circuit further includes a tree distribution circuit coupled to the clock grid.

4. The circuit for distributing a clock signal, as defined by claim 3, wherein the integrated circuit has a plurality of operating sectors and wherein the at least one conductor further comprises a tree distribution circuit corresponding to a respective one of the sectors of the integrated circuit.

5. The circuit for distributing a clock signal, as defined by claim 1, wherein the at least one inductor includes a plurality of inductors distributed throughout the clock distribution circuit.

6. The circuit for distributing a clock signal, as defined by claim 5, wherein the plurality of inductors each take the form of a spiral inductor.

7. The circuit for distributing a clock signal, as defined by claim 6, further comprising a plurality of decoupling capacitors formed in the integrated circuit, each one of the plurality of decoupling capacitors corresponding to a respective one of the plurality of spiral inductors, wherein each one of the spiral inductors is coupled to a power-ground grid potential in the integrated circuit by a corresponding decoupling capacitor.

8. The circuit for distributing a clock signal, as defined by claim 1, further comprising at least one decoupling capacitor formed in the integrated circuit, wherein the at least one inductor is coupled to a power-ground grid potential by the at least one decoupling capacitor formed in the integrated circuit.

9. A circuit for providing a clock signal in an integrated circuit comprising: a clock driver circuit, the clock driver circuit providing a clock signal having a clock frequency; a clock distribution circuit having at least one conductor therein, the clock distribution circuit being coupled to receive the clock signal from the clock driver circuit; and a plurality of additional inductors coupled to the clock distribution circuit, the plurality of additional inductors being spatially distributed throughout the clock distribution circuit and having a total inductance value such that the additional inductors and the clock distribution circuit form a resonant circuit having a resonance frequency substantially equal to the clock frequency.

10. The circuit for providing a clock signal, as defined by claim 9, wherein the at least one conductor in the clock distribution circuit includes a clock grid.

11. The circuit for providing a clock signal, as defined by claim 10, wherein the at least one conductor in the clock distribution circuit further includes a tree distribution circuit coupled to the clock grid.

12. The circuit for providing a clock signal, as defined by claim 11, wherein the integrated circuit has a plurality of operating sectors and wherein the at least one conductor further comprises a plurality of tree distribution circuits corresponding to respective ones of the plurality of operating sectors of the integrated circuit.

13. The circuit for providing a clock signal, as defined by claim 12, wherein the clock driver circuit includes a plurality of buffer amplifiers, wherein each one of the plurality of tree distribution circuits corresponding to a respective one of the plurality of operating sector is coupled to at least one of the plurality of buffer amplifiers.

14. The circuit for a clock signal, as defined by claim 13, wherein the clock distribution circuit includes at least one further tree distribution circuit, said further tree distribution circuit being coupled to the buffer amplifiers in a plurality of sectors of the integrated circuit.

15. The circuit for providing a clock signal, as defined by claim 12, wherein the clock driver circuit comprises a plurality of phase lock loop circuits, wherein each one of the plurality of tree distribution circuits corresponding to a respective one of the plurality of operative sectors is coupled though the at least one of the plurality of buffer amplifiers to at least one of the plurality of phase lock loop circuits.

16. The circuit for providing a clock signal, as defined by claim 9, wherein each one of the plurality of inductors is a spiral inductor.

17. The circuit for providing a clock signal, as defined by claim 16, further comprising a plurality of decoupling capacitors formed in the integrated circuit, each one of the plurality of decoupling capacitors corresponding to a respective one of the plurality of spiral inductors, wherein the spiral inductors are coupled to a power-ground grid potential in the integrated circuit by a corresponding one of the plurality of decoupling capacitor.

18. The circuit for providing a clock signal, as defined by claim 17, wherein a voltage potential at a junction of one of the plurality of spiral inductors and a corresponding one of the plurality of the decoupling capacitors is provided as a reference voltage for psuedodifferential switching of the clock signal.

19. The circuit for providing a clock signal, as defined by claim 9, further comprising at least one capacitor switchably coupled to the clock distribution circuit, whereby the total capacitance of the clock distribution circuit can be tuned by switching said at least one capacitor.

20. A method of distributing a clock signal having a clock frequency in an integrated circuit having at least one clock distribution conductor therein, comprising: determining the capacitance of clock distribution conductor and circuitry coupled thereto; determining the inductance value of at least one parallel connected inductor in addition to the clock distribution conductor and circuitry coupled thereto required to form a resonance circuit with the clock distribution conductor and the circuitry coupled thereto, having a resonance frequency equal to the clock frequency; and coupling the at least one parallel-connected inductor to said clock distribution conductor to provide said inductance value.

* * * * *

UNITED STATES PATENT AND TRADEMARK OFFICE
CERTIFICATE OF CORRECTION

PATENT NO. : 7,145,408 B2  
APPLICATION NO. : 10/501278  
DATED : December 5, 2006  
INVENTOR(S) : Shepard et al.

Page 1 of 1

It is certified that error appears in the above-identified patent and that said Letters Patent is hereby corrected as shown below:

Column 1, line 16, please insert the following header and paragraph:

-- Statement Regarding Federally Sponsored Research or Development
This invention was made with government support under grant number 0086007 awarded by the National Science Foundation. The government has certain rights in the invention. --

Signed and Sealed this

Seventeenth Day of June, 2008

JON W. DUDAS  
*Director of the United States Patent and Trademark Office*